June 16, 1931.    N. A. WAHLBERG    1,809,997
TRANSMISSION LINE DEVICE
Filed July 30, 1927
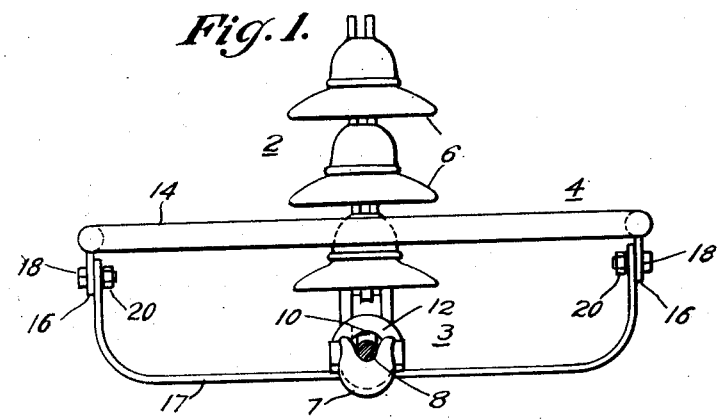
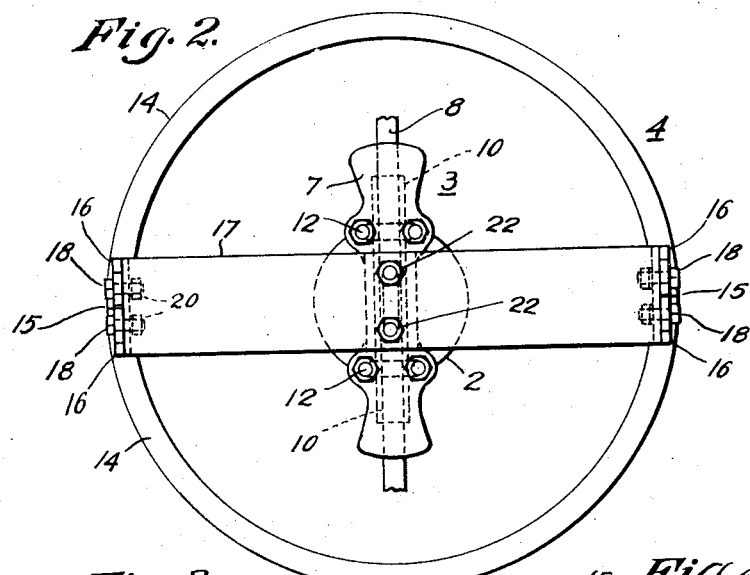
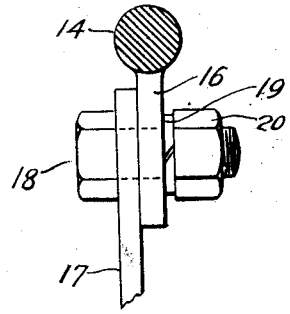
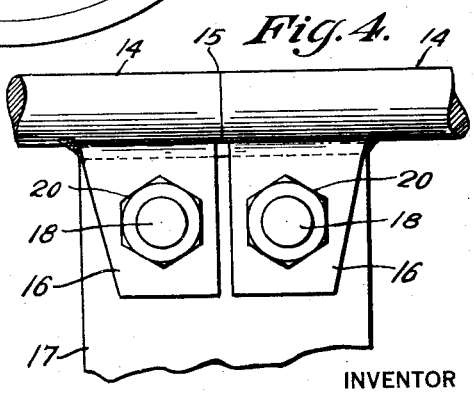
INVENTOR
Nils A. Wahlberg
BY
ATTORNEY Patented June 16, 1931

1,809,997

UNITED STATES PATENT OFFICE

NILS A. WAHLBERG, OF WILKINSBURG, PENNSYLVANIA, ASSIGNOR TO WESTINGHOUSE ELECTRIC & MANUFACTURING COMPANY, A CORPORATION OF PENNSYLVANIA

TRANSMISSION LINE DEVICE

Application filed July 30, 1927. Serial No. 209,440.

My invention relates to transmission-line devices and particularly to electrostatic-field-controlling elements, such as arcing rings, for association with high-voltage suspension insulators.

One object of my invention is to provide a device, of the above-indicated character, that shall greatly facilitate its manufacture, assembly and mounting in operative position.

Another object of my invention is to provide a divided annular arcing ring or a similar device that shall be so supported at its under side as to provide uninterrupted arc-assuming upper and side surfaces.

Another object of my invention is to provide an electrostatic-field-controlling ring or torus that shall comprise half sections and a single member for mounting the device as a unit and for securing the half sections to each other.

A further object of my invention is to provide a transmission-line device that shall be simple and durable in construction, economical to manufacture and effective in its operation.

In transmission-line practice, where electrostatic-field-control means, such as arcing rings, are disposed around the insulators in considerably laterally spaced relation thereto, difficulties have been encountered during manufacture in suitably and economically mounting supporting means for the annular portions of the devices.

Arcing rings, of relatively great diameter and constructed of round rod or tubular stock, present difficulties in attaching inwardly projecting arms for supporting the same at the centers thereof, and sometimes result in structures which cause arcing to the lower supporting portions, instead of to the annular portions which are intended to receive the arcs.

Rings, constructed of one integral or homogeneous part, require the detachment of the insulator, at one of its ends, from the tower or clamp, with which it cooperates, for the reception of the ring around the insulator inwardly from its ends.

It is my aim to provide an electrostatic-field-control ring or device that shall be divided or halved; that shall include flat strap-like lugs attached to portions of round cross-sectional area and that shall embody a mounting member of one piece and have other features of advantage to render it an improvement, in general, over similar devices heretofore employed.

Figure 1 of the accompanying drawings is a side elevational view, as viewed in the direction of a transmission line conductor, of a device embodying my invention, Fig. 2 is a bottom plan view of the structure shown in Fig. 1, Fig. 3 is an enlarged detail view of a portion of the device shown in the other figures, and Fig. 4 is a detail view taken at right angles to Fig. 3.

The device comprises, in general, an insulator structure 2, a clamping device 3 and an electrostatic-field-controlling element 4, of my invention.

The insulator 2 is of a usual series-string-suspension type embodying flexibly connected insulator units 6 of the cap-and-pin type for attachment, at the upper end thereof, to a tower or other support (not shown), and, at the lower end thereof, to the clamp 3.

The clamp 3, which may be of any usual and well-known type, is here shown as comprising a conductor-receiving or channel member 7 for the reception of a conductor 8, a clamping shoe member 10, and U-bolts 12, or other suitable means, for clamping the conductor in the channel member.

The electrostatic-field-controlling element 4 comprises divided or half sections 14 of round cross-sectional contour, adjacent to the divisions 15 of which laterally or downwardly projecting lugs 16 of flat strap-like material are secured, as by welding. The lugs 16 are preferably welded at upper edges thereof along the sides of the half sections 14, adjacent lugs at each division of the ring being preferably disposed in the same plane and centrally disposed under the ring, although one or both of the lugs may be mounted slightly offset from this central position.

The element 4 further comprises a supporting member 17, of flat strap form bent to substantially U-shape, having a pair of openings adjacent to each end for the reception of bolts 18 that also extend through the lugs 16 and are held in position, as by lock washers 19 and nuts 20. The member 17 is secured to the channel member 7, as by bolts 22 or other suitable means.

In the above-described structure, by having the lugs 16 of relatively thin strap-like character and mounted along the sections 14, as shown, the round field-distributing or arc-assuming surfaces of the portions 14 are comparatively free of interruptions, and a structure of much simpler manufacture is provided than one in which round portions are attached to the sections 14 instead of the lugs 12.

Also, in contradistinction to similar devices in which the sections 14 are integrally united, the device of my invention is of advantage in permitting its mounting around the insulator without detaching the clamp therefrom.

A structure wherein a simple member, such as the member 17, functions both as supporting means for the device as a unit and as means for attaching the half sections 14 to each other is also a feature of advantage and improvement.

However, one of the main advantages of my invention resides in its manufacture from standard stock parts of simple shape, by few operations, to provide an extremely economical device of ready assembly and mounting, and effective in its operation.

While I have shown and described a particular form of my invention, changes may be effected therein without departing from the spirit and scope thereof, as set forth in the appended claims.

I claim as my invention:

1. An electrostatic-field-control loop, and supporting means therefor including a plurality of projections united to the loop, each of said projections being so formed that a cross-section thereof in a plane containing the loop axis is a rectangle with both of the longer sides substantially parallel to the loop axis and intersecting the surface of the loop at positions substantially displaced from the field, the dimension of the shorter sides being less than the maximum thickness of the perimetral portion of the loop measured perpendicular to the loop axis, and each of said projections having a relatively large surface substantially parallel to the loop axis and concentric with the mean circumference of the loop.

2. An electrostatic-field-control loop including separable end-to-end related portions, and supporting means therefor including elements of substantially less thickness than the maximum thickness of the perimetral portion of the loop measured perpendicular to the loop axis, and connected one adjacent to the end of each of said portions at positions substantially displaced from the plane of the field, said plane being at right angles to the loop axis, and a section of the length of each element extending away from the loop in the general direction of the axis.

3. An electrostatic-field-control loop including separable end-to-end related perimetral portions of round cross-sectional area, sheet-like lugs of substantially less thickness than the diameter of said portions connected one adjacent to the end of each of said portions at a position substantially displaced from the plane of the loop nearest the field, said plane being at right angles to the loop axis, said lugs extending along the perimeter of the loop and away from the loop and the field, and means for connecting said lugs including a sheet-like member disposed in side-surface relation thereto and extending away from the loop and the field, said member being of substantially less thickness than the diameter of said area and displaced from said plane.

4. An electrostatic-field-control loop including separable end-to-end related perimetral portions of round cross-sectional area, sheet-like lugs of substantially less thickness than the diameter of said portions connected one adjacent to the end of each of said portions at a position substantially displaced from the plane of the loop nearest the field, said plane being at right angles to the loop axis, said lugs extending along the perimeter of the loop and away from the loop and the field, and means for connecting said lugs and supporting the loop including arms extending substantially radially inwardly of the loop, said arms having sheet-like outer ends disposed in side-surface relation to said lugs and being of substantially less thickness than the diameter of said area and displaced from said plane.

In testimony whereof, I have hereunto subscribed my name this 23rd day of July, 1927.

NILS A. WAHLBERG.